April 25, 1933.  A. D. KERR  1,905,104
BEARING FOR INK ROLL DOCTORS
Filed Nov. 28, 1930    2 Sheets-Sheet 1

Inventor
Arthur D. Kerr
By Attorneys
Southgate Fay & Hanley

April 25, 1933. A. D. KERR 1,905,104
BEARING FOR INK ROLL DOCTORS
Filed Nov. 28, 1930 2 Sheets-Sheet 2
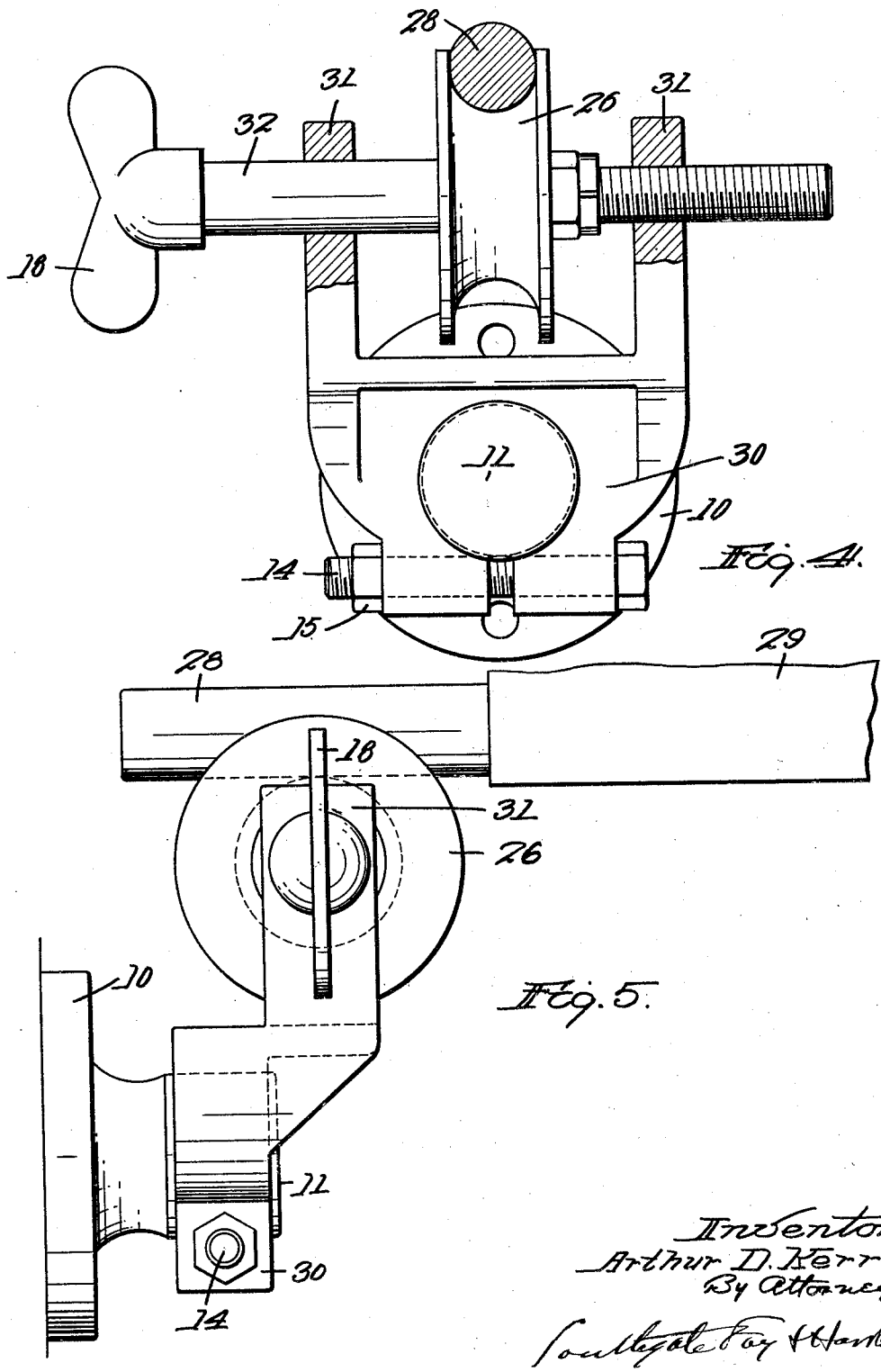

Patented Apr. 25, 1933

1,905,104

UNITED STATES PATENT OFFICE

ARTHUR DUNLAP KERR, OF HOLDEN, MASSACHUSETTS, ASSIGNOR TO RICE, BARTON & FALES, INCORPORATED, OF WORCESTER, MASSACHUSETTS, A CORPORATION OF MASSACHUSETTS

BEARING FOR INK ROLL DOCTORS

Application filed November 28, 1930. Serial No. 498,534.

This invention relates to bearings for doctors on textile printing machines and the like.

The principal objects of the invention are to provide a practicable form of bearing for the doctor so as to use less power, permit of an improved quality of printing, and require less frequent replacement of worn parts; to provide a construction which will reduce the number of parts of the doctor from three to one and to provide an improved means for supporting the bearing so as to permit of adjustment without danger of the dropping of one end of the doctor.

Other objects and advantages of the invention will appear hereinafter.

Reference is to be had to the accompanying drawings, in which

Fig. 4 is a view like Fig. 1 showing how the invention can be applied when the bearing is centrally located, and Fig. 5 is an end view of the same.

Figure 1:
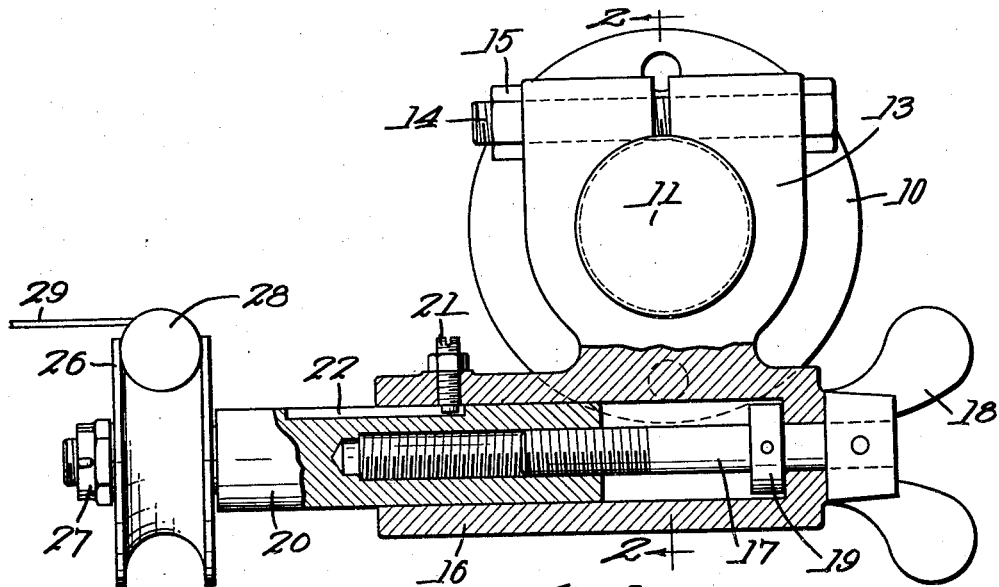
Fig. 1 is a face view of a bearing for a textile machine doctor constructed in accordance with this invention, shown partly in section.
Figures 2, 3:
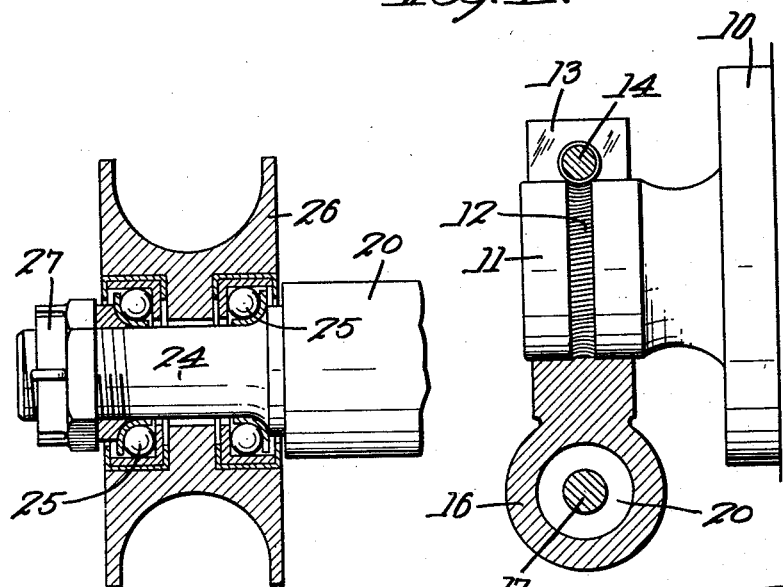
Fig. 2 is a sectional view on the line 2—2 of Fig. 1.
Fig. 3 is a central sectional view of the roller on the bearing.

The doctors for textile printing machines as heretofore constructed are vibrated longitudinally for purposes well understood in this art. As they slide endwise in their bearings it is considered necessary to put renewable sleeves on both the journals to take up the wear. These sleeves are made of steel and are replaced whenever sufficiently worn, which occurs frequently. Of course, these journals are located at the opposite ends of the doctor and they have to be lubricated. When the sleeves are worn, the support for the doctor becomes inaccurate and the doctor cannot properly accomplish its work.

By the present invention, instead of having a tubular bearing at each end extending longitudinally, I substitute a grooved roller in the groove of which rests each journal end of the doctor and the renewable sleeve is entirely eliminated.

In the form shown in the first three figures the whole bearing is supported by a foot 10, which is fixed to the machine frame instead of being adjustable circumferentially as has been the case with the old foot. This foot is provided with a central hub 11 provided with a circumferential or arcuate screw thread 12.

On this hub is located a split collar 13 having a screw 14 arranged across the split portion and tangential to the screw 12 and meshing therewith. The turning of this screw 14 will result in turning the collar 13. This split collar is also fastened in fixed position by screwing up a nut 15 on this screw 14.

The collar constitutes a bracket which carries a cylinder 16 arranged tangentially into the end of which extends a screw 17 with a winged nut 18 on the end. This screw is prevented from having any longitudinal motion in the cylinder by a collar 19 within the cylinder 16. This screw at its end enters a screw-threaded axial opening in the end of a support 20 and obviously the turning of the wing nut will move this support out and in, being carried by the inside of the cylinder and accurately supported thereby.

A stop screw 21 extends from the cylinder into a longitudinal slot 22 in this support to limit its motion in either direction, and to prevent support 20 from rotating in the cylinder 16.

On the support 20 there is a reduced end 24 carrying inner races of a set of ball bearings 25. The outer races are located in a roller or wheel 26 and fixed thereto in any ordinary way and the whole is secured by lock and check nuts 27 as desired. This roller 26 therefore is mounted on anti-friction bearings and is capable of rotation without absorbing much power. It is provided with a semi-cylindrical annular groove and in this groove rests the journal end 28 of the doctor 29. The doctor is vibrated longitudinally in the usual way and held against the doctoring surface by yielding means as usual, not shown herein.

It will be seen that this vibration of the doctor will be rendered much easier and that, with the bearing of the doctor journal on this roller, its endwise motion can be carried on for a long period of time without any wear that will reduce the steadiness of the doctor or quality of printing. There will be less wear and therefore less frequent replacement of worn parts. On account of the doctor sliding instead of rotating the wear on the old bearings came all on one side of the bearings. By the present invention this is eliminated. This bearing is to some extent self-aligning as the journal of the doctor is not confined in a definite cylindrical opening.

It will be seen that the two sleeves on the journals of the doctor are no longer necessary, that less power is required to operate the doctors on account of the rolling motion instead of the sliding motion under pressure and perfect alignment can be secured at all times.

It will be understood that while the use of anti-friction bearings improves the device, this invention can be carried out without the use of such bearings.

The improved foot for holding the whole device also involves some additional advantages as this foot does not have to be loosened in the side frame in order to adjust it, which in the old style sometimes resulted in the dropping of the doctor at one end, causing considerable trouble and delay.

In the form shown in Figs. 4 and 5 similar conditions exist except that the roller support is located centrally instead of being overhung. In this case the foot 10 is the same in all respects but the bracket 30 is of a different shape having two arms 31 extending outwardly from the collar 30 and with holes to support a shaft 32, the shaft and one of the holes being screw-threaded for adjustment. Otherwise the parts are substantially the same.

Although I have illustrated and described only two forms of the invention I am aware of the fact that other modifications can be made therein by any person skilled in the art without departing from the scope of the invention as expressed in the claims. Therefore I do not wish to be limited in this respect but what I do claim is:—

1. A support for a doctor blade comprising a bracket stationarily mounted and having a hub thereon provided with an arcuate screw-thread, a split collar surrounding and supported by said hub, a screw extending through the collar from one side to the other and meshing with the thread on the hub for adjusting the collar circumferentially, means on the screw for tightening the collar on the hub, and a roller supported by the collar serving as a bearing for the journal of the doctor.

2. The combination with a doctor having a journal for supporting it, of a fixed foot having a hub, a collar mounted to turn on the hub, a cylinder carried by the collar, a support carried by the cylinder, and a grooved roller freely rotatable on the support in the groove of which said journal is adapted to move longitudinally and to turn.

3. The combination with a doctor having a journal for supporting it, of a fixed foot having a hub, a collar mounted to turn on the hub, means for turning the collar about the axis of the hub, a cylinder carried by the collar and having an axis at right angles to that of the hub, a support carried by the cylinder, means for adjusting the support along the cylinder, and a grooved roller freely rotatable on the support in the groove of which said journal is adapted to move longitudinally and to turn, the axis of the journal and hub being parallel.

In testimony whereof I have hereunto affixed my signature.

ARTHUR DUNLAP KERR.